(12) United States Patent
Xi et al.

(10) Patent No.: US 9,027,154 B2
(45) Date of Patent: May 5, 2015

(54) METHOD, APPARATUS AND SYSTEM FOR MANAGING DOCUMENT RIGHTS

(71) Applicant: Huawei Technologies Co., Ltd., Shenzhen (CN)

(72) Inventors: Yuxiao Xi, Shenzhen (CN); Dun Chen, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 18 days.

(21) Appl. No.: 13/873,795

(22) Filed: Apr. 30, 2013

(65) Prior Publication Data

US 2013/0239229 A1    Sep. 12, 2013

Related U.S. Application Data

(63) Continuation of application No. PCT/CN2012/078660, filed on Jul. 14, 2012.

(30) Foreign Application Priority Data

Jul. 26, 2011 (CN) .......................... 2011 1 0209924

(51) Int. Cl.
*G06F 21/62* (2013.01)
*H04L 9/08* (2006.01)
(Continued)

(52) U.S. Cl.
CPC ............ *G06F 21/6218* (2013.01); *H04L 9/088* (2013.01); *H04L 2209/603* (2013.01); *H04L 63/102* (2013.01); *G06Q 10/10* (2013.01); *G06F 21/604* (2013.01)

(58) Field of Classification Search
CPC .... G06F 21/6218; G06F 21/604; H04L 63/10
USPC .......................................................... 726/27
See application file for complete search history.

(56) References Cited

U.S. PATENT DOCUMENTS 7,051,005 B1 * 5/2006 Peinado et al. .................. 705/57
7,680,830 B1 * 3/2010 Ohr et al. .................... 707/999.2
(Continued)

FOREIGN PATENT DOCUMENTS

| CN | 1818919 | 8/2006 |
| CN | 101364984 | 2/2009 |

(Continued)

OTHER PUBLICATIONS

International Search Report of PCT/CN2012/078660 mailed Aug. 30, 2012.
(Continued)

*Primary Examiner* — Joseph P Hirl
*Assistant Examiner* — J. Brant Murphy
(74) *Attorney, Agent, or Firm* — Staas & Halsey LLP

(57) ABSTRACT

Embodiments of the present invention provide a method, an apparatus and a system for managing document rights. In the method, the apparatus and the system for managing document rights which are provided in the embodiments of the present invention, a server receives a rights request from a client, where the rights request is used for obtaining rights information of a document; determines, according to the rights request, whether the first rights information of the document is saved; when the first rights information is not saved, sends, to the client, the second rights information corresponding to the document confidentiality level, so that the client decrypts the document according to the second rights information; and when the first rights information is saved, sends the first rights information to the client so that the client decrypts the document according to the saved first rights information.

6 Claims, 3 Drawing Sheets

(51) Int. Cl.
*H04L 29/06* (2006.01)
*G06Q 10/10* (2012.01)
*G06F 21/60* (2013.01)

(56) References Cited

U.S. PATENT DOCUMENTS

| | | | |
|---|---|---|---|
| 7,707,642 B1* | 4/2010 | Herbach et al. | 726/27 |
| 8,239,351 B2* | 8/2012 | Hornqvist | 707/687 |
| 2002/0077985 A1* | 6/2002 | Kobata et al. | 705/51 |
| 2005/0097061 A1* | 5/2005 | Shapiro et al. | 705/67 |
| 2005/0097441 A1* | 5/2005 | Herbach et al. | 715/501.1 |
| 2005/0193211 A1* | 9/2005 | Kurose | 713/185 |
| 2007/0025550 A1* | 2/2007 | Saitoh | 380/1 |
| 2007/0097959 A1* | 5/2007 | Taylor | 370/352 |
| 2007/0255743 A1* | 11/2007 | Gaucas | 707/102 |
| 2007/0288991 A1* | 12/2007 | Takaragi et al. | 726/1 |
| 2008/0104124 A1* | 5/2008 | Bao et al. | 707/104.1 |
| 2008/0141334 A1 | 6/2008 | Wicker et al. | |
| 2008/0147751 A1* | 6/2008 | Bao et al. | 707/202 |
| 2009/0106249 A1* | 4/2009 | Saito | 707/9 |
| 2009/0287837 A1* | 11/2009 | Felsher | 709/229 |
| 2010/0023491 A1* | 1/2010 | Huang et al. | 707/3 |
| 2010/0146640 A1* | 6/2010 | Wang et al. | 726/31 |
| 2010/0251382 A1 | 9/2010 | Goto et al. | |
| 2011/0141513 A1 | 6/2011 | Nakanowatari et al. | |
| 2011/0145702 A1* | 6/2011 | Kakehi | 715/255 |
| 2012/0144192 A1 | 6/2012 | Chen et al. | |
| 2013/0212151 A1* | 8/2013 | Herbach et al. | 709/203 |
| 2013/0212707 A1* | 8/2013 | Donahue et al. | 726/29 |
| 2013/0239229 A1* | 9/2013 | XI et al. | 726/27 |

FOREIGN PATENT DOCUMENTS

| | | |
|---|---|---|
| CN | 101583953 | 11/2009 |
| CN | 101626378 | 1/2010 |
| CN | 102103667 | 6/2011 |
| CN | 102281141 | 12/2011 |
| EP | 2234374 | 9/2010 |
| WO | 00/57684 | 10/2000 |
| WO | 02/06931 A2 | 1/2002 |

OTHER PUBLICATIONS

Extended European Search Report issued Oct. 9, 2014 in corresponding European Patent Application No. 12818081.7.

* cited by examiner

METHOD, APPARATUS AND SYSTEM FOR MANAGING DOCUMENT RIGHTS

CROSS-REFERENCE TO RELATED APPLICATIONS

This application is a continuation application of International application No. PCT/CN2012/078660, which is filed Jul. 14, 2012, and claims priority to Chinese Patent Application No. 201110209924.9, filed with the Chinese Patent Office on Jul. 26, 2011 and entitled "METHOD, APPARATUS AND SYSTEM FOR MANAGING DOCUMENT RIGHTS", both of which is incorporated herein by reference in its entirety.

FIELD OF THE INVENTION

The present invention relates to the security field, and in particular, to a method, an apparatus, and a system for managing document rights.

BACKGROUND OF THE INVENTION

To ensure internal information security, a file encryption system is usually deployed within a modern enterprise. The file encryption system usually includes two parts: a server and a client. The client runs on a computer of a user, and may have a graphic interface for operation, and the client is usually used for file encryption and decryption. The server is usually used to store user information and file authorization information.

During document distribution, an author of a document (or a designated person with a right of reauthorization) usually needs to designate who has what rights on this document in a client program. The rights have multiple granularities, and some may be designated in different rights levels such as reading, editing, printing, and complete control; and usually, an individual person, a department, or a group may be designated at the time of personnel designation. Such document rights need to be saved. At the time of opening a file, the saved document rights are applied.

In the prior art, the rights information of a document is saved in two manners: one is saving the rights information in a header of an encrypted file, and the other is saving the rights information in a server. When the rights information is saved in the file header, at the time of decryption, the client sends the file rights information to the server, and the server decrypts the file rights information and returns it to the client. In this method, the server does not need to store the file rights information, which greatly relieves the pressure of data storage, retrieval and maintenance of the server, especially in a case where a data amount is large. However, all the rights are saved inside the document and the server has no rights information, and therefore, once the document is distributed, rights of the document are not modifiable, which makes that the rights information cannot be withdrawn. When the rights information is saved in the server, the amount of data saved in the server increases linearly with increase of the number of documents. As a result, the capacity the server must be expanded, which increases costs of the enterprise.

SUMMARY OF THE INVENTION

Embodiments of the present invention provide a method, an apparatus, and a system for managing document rights to solve a problem of infinite increase of the amount of file rights information stored in a server, clear unwanted data effectively, relieve a storage load of the server, and reduce operation and maintenance costs.

In a first aspect, an embodiment of the present invention provides a method for managing document rights, including:

receiving, by a server, a rights request from a client, where the rights request is used for obtaining rights information of a document;

according to the rights request, determining whether first rights information of the document is saved;

when the first rights information is not saved, sending, to the client, second rights information corresponding to a document confidentiality level, so that the client decrypts the document according to the second rights information, where the second rights information is used to replace the first rights information after the first rights information of the document expires, documents at a same document confidentiality level have same second rights information, and the document confidentiality level is used to identify a secrecy level of the document; and when the first rights information is saved, sending the first rights information to the client so that the client decrypts the document according to the saved first rights information.

In a second aspect, an embodiment of the present invention provides an apparatus for managing document rights, including:

a first request receiving module, configured to receive a rights request from a client, where the rights request is used for obtaining rights information of a document;

a first determining module, configured to determine, according to the rights request, whether first rights information of the document is saved;

a first processing module, configured to, when the first determining module determines that the first rights information is not saved, send, to the client, second rights information corresponding to a document confidentiality level, so that the client decrypts the document according to the second rights information, where the second rights information is used to replace the first rights information after the first rights information of the document expires, documents at a same document confidentiality level have same second rights information, and the document confidentiality level is used to identify a secrecy level of the document; and a second processing module, configured to, when the first determining module determines that the first rights information is saved, send the first rights information to the client so that the client decrypts the document according to the saved first rights information.

In a third aspect, an embodiment of the present invention provides a method for managing document rights, including:

receiving, by a server, a rights request from a client, where the rights request is used for obtaining rights information of a document, and the document carries first rights information;

according to the rights request, determining whether the first rights information of the document is saved;

when the first rights information is not saved and it is determined that the first rights information carried in the document expires, sending, to the client, second rights information corresponding to a document confidentiality level, so that the client decrypts the document according to the second rights information, where the second rights information is used to replace the first rights information after the first rights information of the document expires, documents at a same document confidentiality level have same second rights information, and the document confidentiality level is used to identify a secrecy level of the document; and when the first rights information is not saved and the first rights information carried in the document does not expire, instructing the client to decrypt the document according to the first rights information carried in the document; and when the first rights information is saved, sending the first rights information to the client so that the client decrypts the document according to the saved first rights information.

In a fourth aspect, an embodiment of the present invention provides an apparatus for managing document rights, including:

a second request receiving module, configured to receive a rights request from a client, where the rights request is used for obtaining rights information of a document, and the document carries first rights information;

a second determining module, configured to determine, according to the rights request received by the second request receiving module, whether first rights information of the document is saved;

a third processing module, configured to, when the first rights information is not saved and it is determined that the first rights information carried in the document expires, send, to the client, second rights information corresponding to a document confidentiality level, so that the client decrypts the document according to the second rights information, where the second rights information is used to replace the first rights information after the first rights information of the document expires, documents at a same document confidentiality level have same second rights information, and the document confidentiality level is used to identify a secrecy level of the document; and when the second determining module determines that first rights information is not saved and that the first rights information carried in the document does not expire, instruct the client to decrypt the document according to the first rights information carried in the document; and a fourth processing module, configured to, when the first rights information is saved, send the first rights information to the client so that the client decrypts the document according to the saved first rights information.

In a fifth aspect, an embodiment of the present invention provides a system for managing document rights, including a client and a server.

The client is configured to send a rights request to the server to obtain rights information of a document; and receive the rights information from the server, and decrypt the document.

The server is configured to: receive the rights request from the client, where the rights request is used for obtaining the rights information of the document; determine, according to the rights request, whether first rights information of the document is saved; when the first rights information is not saved, send to the client, second rights information corresponding to a document confidentiality level, so that the client decrypts the document according to the second rights information, where the second rights information is used to replace the first rights information after the first rights information of the document expires, documents at a same document confidentiality level have same second rights information, and the document confidentiality level is used to identify a secrecy level of the document; and when the first rights information is saved, send the first rights information to the client so that the client decrypts the document according to the saved first rights information.

The server is further configured to update the first rights information to the second rights information corresponding to the document confidentiality level, after the first rights information which is of the document and saved in the server expires.

In a sixth aspect, an embodiment of the present invention provides a system for managing document rights, including a client and a server.

The client is configured to send a rights request to the server to obtain rights information of a document; and receive the rights information from the server, and decrypt the document.

The server is configured to: receive the rights request from the client, where the rights request is used for obtaining the rights information of the document; determine, according to the rights request, whether first rights information of the document is saved; when the first rights information is not saved and the first rights information carried in the document expires, send, to the client, second rights information corresponding to a document confidentiality level, so that the client decrypts the document according to the second rights information, where the second rights information is used to replace the first rights information after the first rights information of the document expires, documents at a same document confidentiality level have same second rights information, and the document confidentiality level identifies a secrecy level of the document; when the first rights information is not saved and the first rights information carried in the document does not expire, instruct the client to decrypt the document according to the first rights information carried in the document; and when the first rights information is saved, send the first rights information to the client so that the client decrypts the document according to the saved first rights information.

The server is further configured to update the first rights information to the second rights information corresponding to the document confidentiality level, after the first rights information which is of the document and saved in the server expires.

According to the method, the apparatus and the system for managing document rights which are provided in the embodiments of the present invention, the server receives the rights request from the client, where the rights request is used for obtaining rights information of a document; determines, according to the rights request, whether the first rights information of the document is saved; when the first rights information is not saved, sends, to the client, the second rights information corresponding to the document confidentiality level, so that the client decrypts the document according to the second rights information; and when the first rights information is saved, sends the first rights information to the client so that the client decrypts the document according to the saved first rights information. In this way, the problem of infinite increase of the amount of file rights information stored in the server is solved, unwanted data is cleared effectively, a storage load of the server is relieved, and operation and maintenance costs are reduced.

BRIEF DESCRIPTION OF THE DRAWINGS

To illustrate technical solutions in embodiments of the present invention or in the prior art more clearly, accompanying drawings required for describing the embodiments are introduced briefly in the following. Apparently, the accompanying drawings in the following description merely show some embodiments of the present invention, and persons of ordinary skill in the art can derive other drawings from these accompanying drawings without creative efforts.

DETAILED DESCRIPTION OF THE EMBODIMENTS

To make the foregoing objective, characteristics, and advantages of the present invention clearer to understand, the following describes the present invention in further detail with reference to accompanying drawings and specific embodiments.

Figure 1:
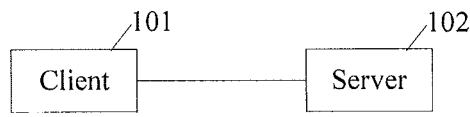
FIG. 1 is an application scenario diagram of a method for managing document rights according to an embodiment of the present invention.

FIG. 1 shows an application scenario of an embodiment of the present invention. The scenario includes a client 101 and a server 102. The client 101 is configured to perform document encryption and document decryption, and the server 102 is configured to store user information and rights information of a file. In this application scenario, a case that multiple files belong to a same document confidentiality level exists.

EMBODIMENT 1

Figure 2:
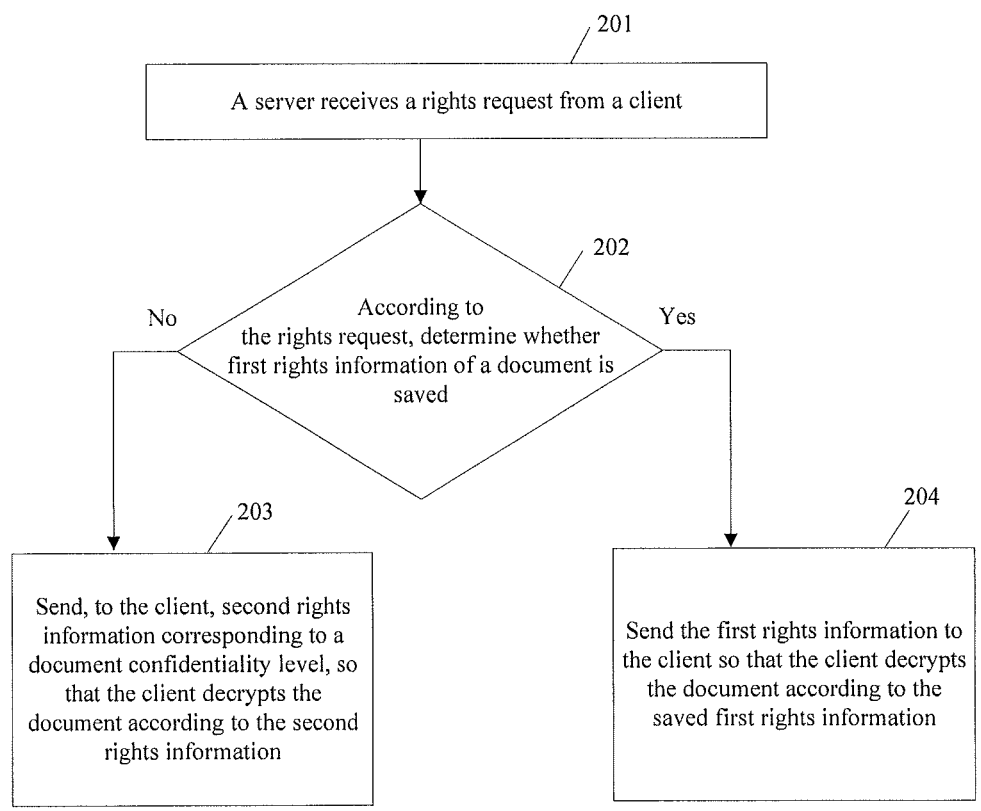
FIG. 2 is a flowchart of a method for managing document rights according to an embodiment of the present invention.

An embodiment of the present invention provides a method for managing document rights. Taking a server 102 as an example, in this embodiment, the rights information of a document is uniformly saved in the server 102; when a client 101 opens the document, the rights information of the document is retrieved from the server 102, and then the server 102 sends the retrieved rights information to the client 101. As shown in FIG. 2, the method includes:

Step 201: The server receives a rights request from the client.

The rights request is used for obtaining rights information of a document, and the rights information is used to decrypt the document of the client.

Step 202: According to the rights request, determine whether first rights information of the document is saved. When the first rights information of the document is saved, step 204 is performed; when the first rights information of the document is not saved, step 203 is performed.

A first right of the document is a right set at the time of releasing the document.

Step 203: Send, to the client, second rights information corresponding to a document confidentiality level, so that the client decrypts the document according to the second rights information, and end the procedure.

The second rights information is used to replace the first rights information when the first rights information of the document expires. Documents at a same document confidentiality level have same second rights information. The document confidentiality level is used to identify the level of confidentiality of the document. Document confidentiality levels may include: for internal use only, secret, confidential, and top secret. For example, second rights information of a confidentiality level which is "for internal use only" may be used as rights information of multiple documents at the confidentiality level which is "for internal use only".

When the document's rights information saved on the server expires, the rights information is replaced with the second rights information corresponding to the document confidentiality level, and the expired rights information is deleted. A specific replacement manner may be that: before the first rights information expires, each document associates with a piece of first rights information, and a document index is saved corresponding to the rights information. After the first rights information expires, the expired first rights information is deleted, and a storage address of the rights information corresponding to the document index is directed to the second rights information corresponding to a document confidentiality level, so that storage addresses of the rights information of multiple documents at the same document confidentiality level are directed to the same second rights information simultaneously. In this way, only one piece of second rights information needs to be saved, thereby effectively reducing occupation of the storage space.

Step 204: Send the first rights information to the client so that the client decrypts the document according to the saved first rights information.

According to the method for managing document rights provided in the embodiment of the present invention, the server receives the rights request from the client, where the rights request is used for obtaining rights information of a document; according to the rights request, determines whether the first rights information of the document is saved; when the first rights information is not saved, sends, to the client, the second rights information corresponding to the document confidentiality level, so that the client decrypts the document according to the second rights information; and when the first rights information is saved, sends the first rights information to the client so that the client decrypts the document according to the saved first rights information. In this way, a problem of infinite increase of the amount of file rights information stored in the server is solved, unwanted data is cleared effectively, a storage load of the server is relieved, and operation and maintenance costs are reduced.

In the foregoing embodiment, during a process that the client 101 encrypts the document, the method further includes: setting expiration time of the first rights information of the document according to the document confidentiality level. An automatic setting manner or a manual setting manner may be adopted. For example, expiration time of a document at a confidentiality level of "for internal use only" or "secret" is 1 year, expiration time of a document at a confidentiality level of "confidential" is 2 years, and expiration time of a document at a confidentiality level of "top secret" is 3 years. Correspondingly, after the first rights information of the document expires, the saved first rights information is deleted and replaced with the second rights information corresponding to confidentiality level. For example, it is considered that document A, document B, and document C which are all at the confidentiality level of "confidential" for over 2 years, can be decrypted and disclosed to a specific group of people. At this time, first rights information of the three documents is replaced with one piece of second rights information uniformly. By using this method, the problem of infinite increase of the amount of file rights information stored in the server is solved, the unwanted data is cleared effectively, the storage load of the server is relieved, and operation and maintenance costs are reduced.

In step 203 in the foregoing embodiment, when the first rights information is not saved in the server, it is indicated that the saved first rights information expires, and the client needs to use the second rights information to decrypt the file. The second rights information may be saved in the server, and may also be saved in the client, which is not limited here. The difference lies in that when the second rights information is saved in the server, the server needs to send the second rights information to the client.

EMBODIMENT 2

Figure 3:
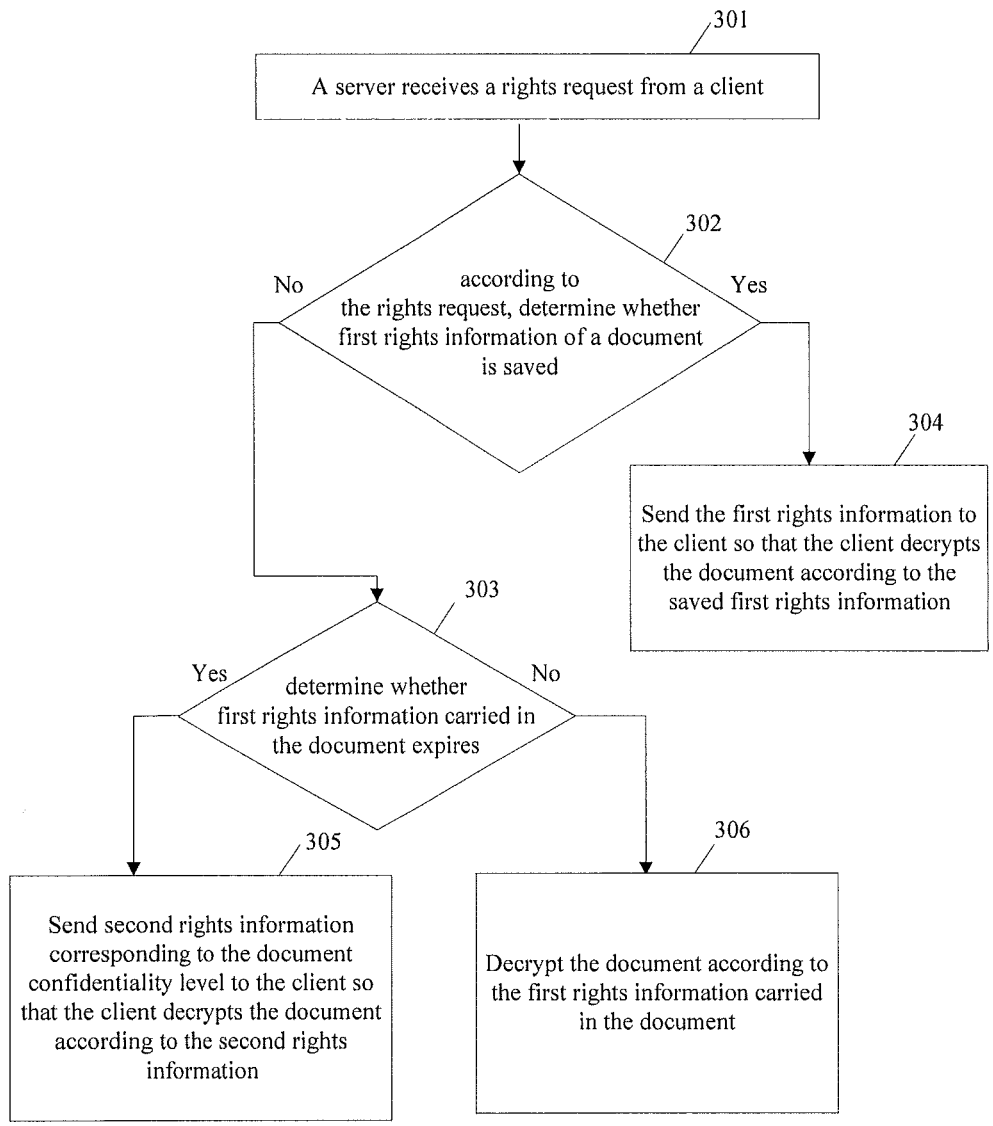
FIG. 3 is a flowchart of another method for managing document rights according to an embodiment of the present invention.

An embodiment of the present invention provides another method for managing document rights. Taking a server 102 as an example, in this embodiment, first rights information of a document is saved in an encrypted document. Meanwhile, if the first rights information is modified, latest first rights information will be saved in the server 102. Each time a document is decrypted, a client 101 may detect on the server 102 whether first rights information of the document has been modified. If modified, first rights information saved in the server is used; if not modified, first rights information saved in the encrypted document is used. As shown in FIG. 3, the method includes:

Step 301: The server receives a rights request from the client.

Step 302: According to the rights request, determine whether first rights information of a document is saved. When the first rights information of the document is saved, step 304 is performed; when the first rights information of the document is not saved, step 303 is performed.

Step 303: Determine whether first rights information carried in the document expires.

Expiration time is also set for the first rights information carried in the document, and it is required to determine whether the first rights information carried in the document expires. When the first rights information carried in the document expires, step 305 is performed; when the first rights information carried in the document does not expire, step 306 is performed.

Step 304: Send the first rights information to the client so that the client decrypts the document according to the saved first rights information, and end the procedure.

Step 305: Send, to the client, second rights information corresponding to a document confidentiality level, so that the client decrypts the document according to the second rights information.

Step 306: Decrypt the document according to the first rights information carried in the document.

In this embodiment, even if the server 102 saves only the modified rights information, the amount of rights information stored in the server still faces a problem of infinite increase. Therefore, in this embodiment, multiple pieces of expired first rights information are deleted, and the multiple pieces of deleted first rights information are replaced with one piece of second information, thereby solving a problem of infinite increase of the amount of file rights information stored in the server, clearing unwanted data effectively, relieving a storage load of the server, and reducing operation and maintenance costs.

Figure 4:
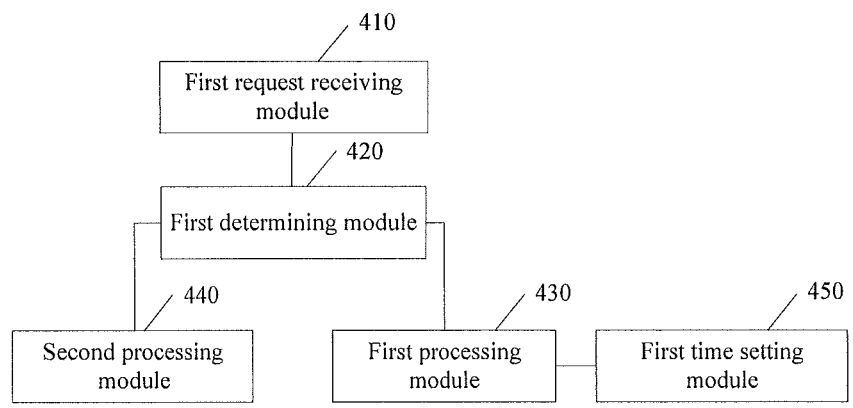
FIG. 4 is a schematic diagram of an apparatus for managing document rights according to an embodiment of the present invention.

An embodiment of the present invention further provides an apparatus for managing document rights As shown in FIG. 4, the apparatus includes:

a first request receiving module 410, configured to receive a rights request from a client, where the rights request is used for obtaining rights information of a document;

a first determining module 420, configured to determine, according to the rights request, whether first rights information of the document is saved;

a first processing module 430, configured to, when the first determining module 420 determines that the first rights information is not saved, send, to the client, second rights information corresponding to a document confidentiality level, so that the client decrypts the document according to the second rights information, where the second rights information is used to replace the first rights information after the first rights information of the document expires, documents at a same document confidentiality level have same second rights information, and the document confidentiality level is used to identify a secrecy level of the document; and a second processing module 440, configured to, when the first determining module 420 determines that the first rights information is saved, send the first rights information to the client so that the client decrypts the document according to the saved first rights information.

The apparatus further includes:

a first time setting module 450, configured to set expiration time of the first rights information of the document according to the document confidentiality level.

Figure 5:
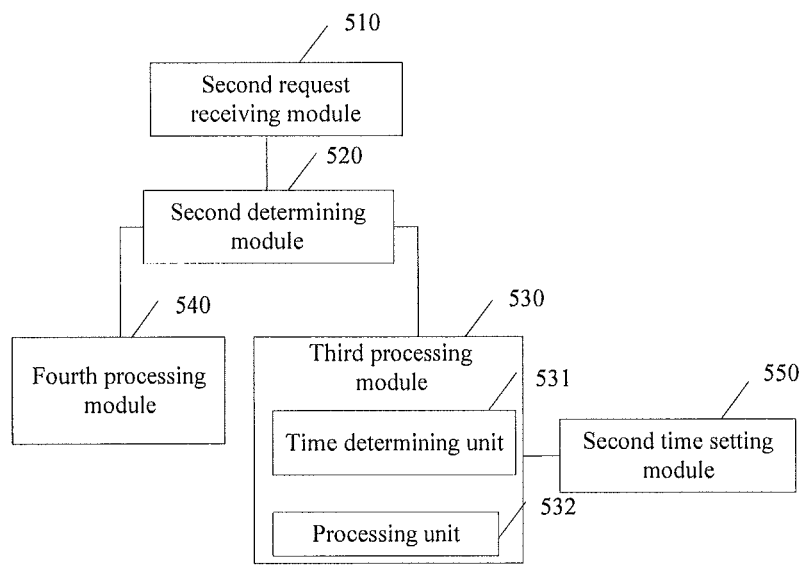
FIG. 5 is a schematic diagram of another apparatus for managing document rights according to an embodiment of the present invention.

An embodiment of the present invention further provides another apparatus for managing document rights. As shown in FIG. 5, the apparatus includes:

a second request receiving module 510, configured to receive a rights request from a client, where the rights request is used for obtaining rights information of a document, and the document carries first rights information;

a second determining module 520, configured to determine, according to the rights request received by the second request receiving module 510, whether first rights information of the document is saved;

a third processing module 530, configured to: when the first rights information is not saved and it is determined that the first rights information carried in the document expires, send, to the client, second rights information corresponding to a document confidentiality level, so that the client decrypts the document according to the second rights information, where the second rights information is used to replace the first rights information after the first rights information of the document expires, documents at a same document confidentiality level have same second rights information, and the document confidentiality level is used to identify a secrecy level of the document; and when the second determining module determines that the first rights information is not saved and that the first rights information carried in the document does not expire, instruct the client to decrypt the document according to the first rights information carried in the document; and a fourth processing module 540, configured to, when the first rights information is saved, send the first rights information to the client so that the client decrypts the document according to the saved first rights information.

The apparatus further includes:

a second time setting module 550, configured to set expiration time of the first rights information of the document according to the document confidentiality level.

The third processing module 530 includes:

a time determining unit 531, configured to determine whether the first rights information carried in the document expires; and a processing unit 532, configured to: when the first rights information is not saved and the time determining unit 531 determines that the first rights information carried in the document expires, send, to the client, the second rights information corresponding to the document confidentiality level, so that the client decrypts the document according to the second rights information; and when the first rights information is not saved and the time determining unit 531 determines that the first rights information carried in the document does not expire, instruct the client to decrypt the document according to the first rights information carried in the document.

An embodiment of the present invention further provides a system for managing document rights, including a client and a server.

The client is configured to send a rights request to the server to obtain rights information of a document, receive the rights information from the server, and decrypt the document.

The server is configured to: receive the rights request from the client, where the rights request is used for obtaining the rights information of the document; determine, according to the rights request, whether first rights information of the document is saved; when the first rights information is not saved, send, to the client, second rights information corresponding to a document confidentiality level, so that the client decrypts the document according to the second rights information, where the second rights information is used to replace the first rights information after the first rights information of the document expires, documents at a same document confidentiality level have same second rights information, and the document confidentiality level is used to identify a secrecy level of the document; and when the first rights information is saved, send the first rights information to the client so that the client decrypts the document according to the saved first rights information.

The server is further configured to update the first rights information to the second rights information corresponding to the document confidentiality level, after the first rights information which is of the document and saved in the server expires.

An embodiment of the present invention further provides another system for managing document rights, including a client and a server.

The client is configured to send a rights request to the server to obtain rights information of a document, receive the rights information from the server, and decrypt the document; and The server is configured to: receive the rights request from the client, where the rights request is used for obtaining the rights information of the document; according to the rights request, determine whether first rights information of the document is saved; when the first rights information is not saved and first rights information carried in the document expires, send, to the client, second rights information corresponding to a document confidentiality level, so that the client decrypts the document according to the second rights information, where the second rights information is used to replace the first rights information after the first rights information of the document expires, documents at a same document confidentiality level have same second rights information, and the document confidentiality level is used to identify a secrecy level of the document; when the first rights information is not saved and the first rights information carried in the document does not expire, instruct the client to decrypt the document according to the first rights information carried in the document; and when the first rights information is saved, send the first rights information to the client so that the client decrypts the document according to the saved first rights information.

The server is further configured to update the first rights information to the second rights information corresponding to the document confidentiality level, after the first rights information which is of the document and saved in the server expires.

Through the description of the foregoing embodiments, persons skilled in the art may clearly understand that the present invention may be implemented by software plus a necessary hardware platform, and definitely may also be implemented by hardware, but in most cases, the former is a preferred implementation manner. Based on such understanding, all or part of the technical solutions of the present invention which make contributions to the prior art may be implemented in a form of a software product. The computer software product is saved in a storage medium such as a ROM/RAM, a magnetic disk, or an optical disk, and includes several instructions for instructing a computer device (which may be a personal computer, a server, a network device, and the like) to execute the methods described in all or part of the embodiments of the present invention.

The present invention is introduced above in detail. Several examples are used for illustration of the principles and implementation manners of the present invention. The description of these examples is used to help understand the methods and its core ideas of the present invention. Those skilled in the art can make modifications to the specific implementation manners and application scope of the present invention according to the ideas of the present invention. In conclusion, the content of this specification shall not be construed as a limitation on the present invention.

What is claimed is:

1. A method for managing rights to electronic documents using authorization files, comprising:

executing, by a computer configured with a memory storing computer executable instructions executed by a processor, a process by:

storing a first authorization file including information for limiting operation on a first electronic document, and a second authorization file including information for limiting operation on a second electronic document, wherein the first authorization file is associated with a first document index indicating the first document, and the second authorization file is associated with a second document index indicating the second document;

deleting the first authorization file after the first authorization file is expired;

after deleting the first authorization file, associating a third authorization file, which includes information for limiting operation on an electronic document, with the first document index;

deleting the second authorization file after the second authorization file is expired;

after deleting the second authorization file, associating the third authorization file with the second document index;

based upon the association between the third authorization file and the first document index, sending the third authorization file in response to a request for obtaining an authorization file for the first document; and based upon the association between the third authorization file and the second document index, sending the third authorization file in response to a request for obtaining an authorization file for the second document.

2. The method according to claim 1, wherein the first authorization file includes authorization information at time of releasing the first document.

3. The method according to claim 1, further comprising:
   setting an expiration time of the first authorization file according to a confidentiality level of the first document.

4. The method according to claim 1, wherein the third authorization file and the first document index are associated by directing a storage address of the deleted first authorization file associated with the first document index to the third authorization file; and the third authorization file and the second document index are associated by directing a storage address of the deleted second authorization file associated with the second document index to the third authorization file.

5. A computer program product comprising a computer readable non-transitory storage medium storing computer executable instructions that, when executed by a computer, implement the following process to manage rights to electronic documents using authorization files, the process comprising:

storing a first authorization file including information for limiting operation on a first document, and a second authorization file including information for limiting operation on a second document, wherein the first authorization file is associated with a first document index indicating the first document, and the second authorization file is associated with a second document index indicating the second document;

deleting the first authorization file after the first authorization file is expired;

after deleting the first authorization file, associating a third authorization file, which includes information for limiting operation on an electronic document, with the first document index;

deleting the second authorization file after the second authorization file is expired;

after deleting the second authorization file, associating the third authorization file with the second document index;

based upon the association between the third authorization file and the first document index, sending the third authorization file in response to a request for obtaining an authorization file for the first document; and based upon the association between the third authorization file and the second document index, sending the third authorization file in response to a request for obtaining an authorization file for the second document.

6. The computer program product according to claim 5, wherein the third authorization file and the first document index are associated by directing a storage address of the deleted first authorization file associated with the first document index to the third authorization file; and the third authorization file and the second document index are associated by directing a storage address of the deleted second authorization file associated with the second document index to the third authorization file.

\* \* \* \* \*